J. A. BORLAND.
DEMOUNTABLE RIM FOR AUTOMOBILE WHEELS.
APPLICATION FILED OCT. 25, 1917.

1,297,316.

Patented Mar. 18, 1919.
3 SHEETS—SHEET 1.

Inventor
John Archie Borland

By Alex. J. Wedderburn, Jr.
Attorney

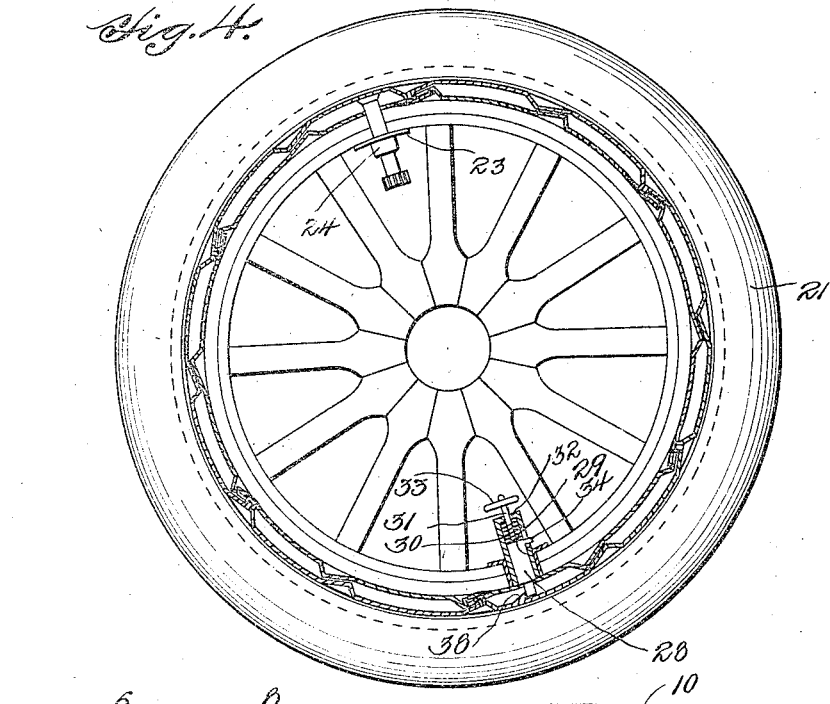

J. A. BORLAND.
DEMOUNTABLE RIM FOR AUTOMOBILE WHEELS.
APPLICATION FILED OCT. 25, 1917.
1,297,316.
Patented Mar. 18, 1919.
3 SHEETS—SHEET 3.
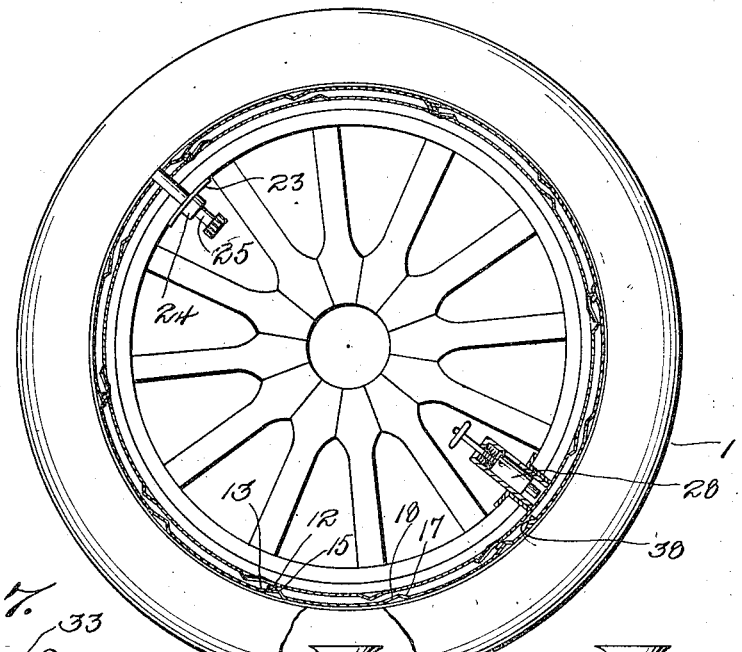
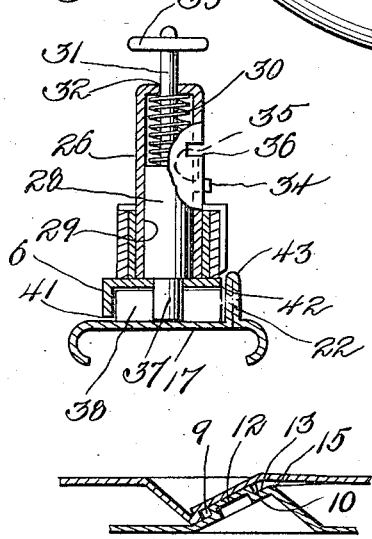
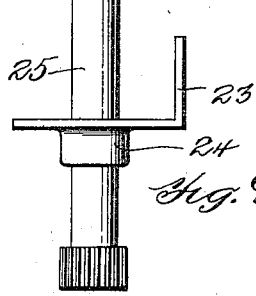
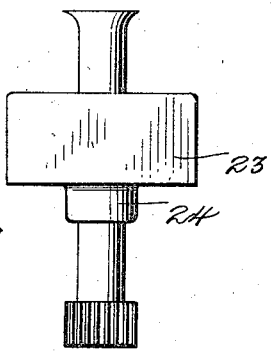
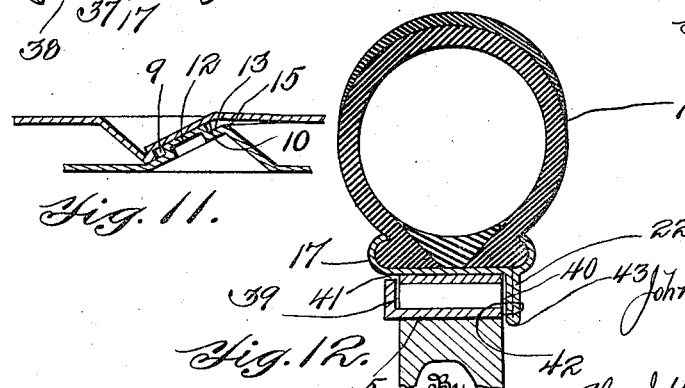
Inventor
John Archie Borland
By
Alex J. Wedderburn, Jr.
Attorney

UNITED STATES PATENT OFFICE.

JOHN ARCHIE BORLAND, OF ST. PAUL, MINNESOTA.

DEMOUNTABLE RIM FOR AUTOMOBILE-WHEELS.

1,297,316.

Specification of Letters Patent.    Patented Mar. 18, 1919.

Application filed October 25, 1917. Serial No. 198,360.

*To all whom it may concern:*

Be it known that I, JOHN ARCHIE BORLAND, a citizen of the United States, residing at St. Paul, in the county of Ramsey and State of Minnesota, have invented certain new and useful Improvements in Demountable Rims for Automobile-Wheels, of which the following is a specification.

This invention relates to demountable rims for automobile wheels and has for its object to provide a rim that may be very quickly mounted and demounted.

Another object of the invention is to provide a wheel rim having tongue and groove connection with a wheel.

A further object of the invention is to provide a novel locking connection between a demountable rim and wheel.

With the above and such other objects as may hereinafter appear, I have invented the device illustrated in the accompanying drawings, in which—

Fig. 4 is a section on line B—B— Fig. 2.

Fig. 5 is a fragmentary perspective view of a felly rim.

Fig. 6 is a similar view of a demountable rim shown inverted.

Fig. 7 is a detail elevational view of a lock member.

Fig. 8 is a view similar to Fig. 4 showing the members in a different position.

Fig. 9 is a detail elevational view of a tire inflating valve used in connection with my invention.

Fig. 10 is another elevational view thereof; and

Fig. 11 is an enlarged longitudinal fragmental section of the rim members shown in locked relation.

Fig. 12 is an enlarged sectional view on line C—C— Fig. 1.

Figure 1:
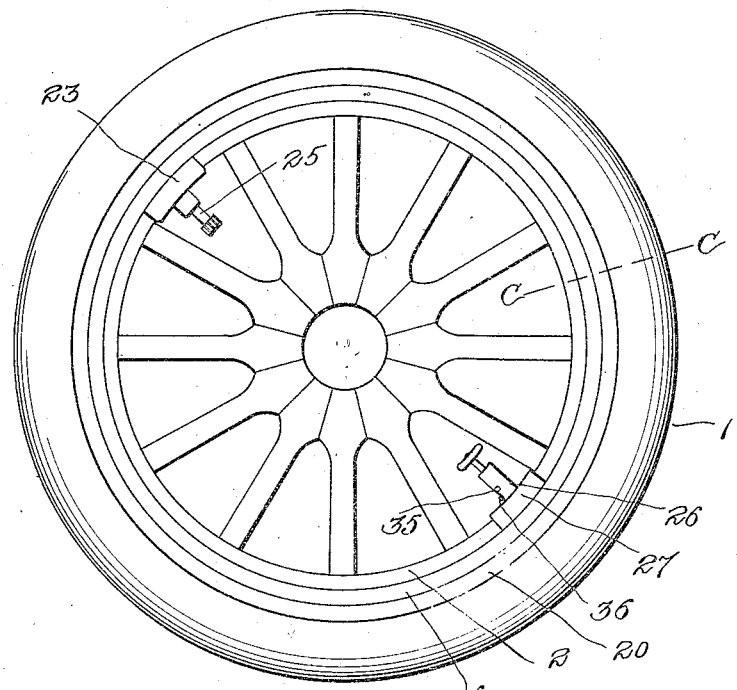
Figure 1 is an elevational view of a wheel embracing my invention.
Figure 2:
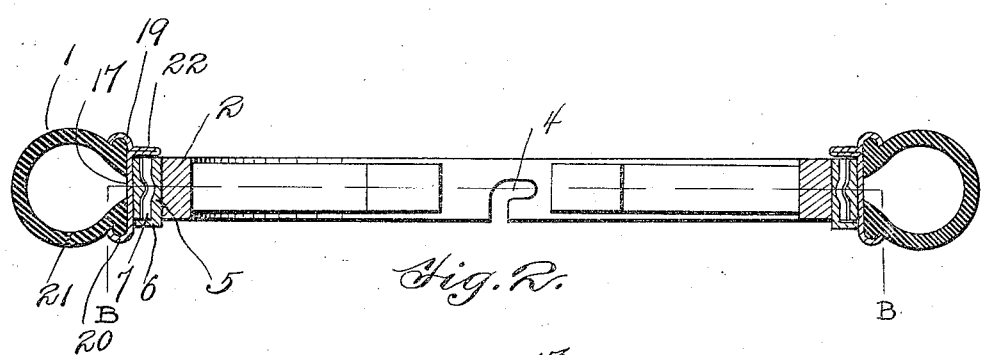
Fig. 2 is a transverse central section thereof.
Figure 3:
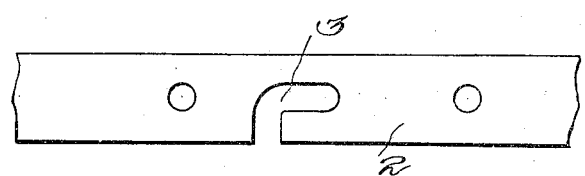
Fig. 3 is a fragmentary plan view of a felly.

Like reference characters indicate like parts throughout the following specification and in the several views in the drawings, in which 1 is a common automobile wheel of any desired or conventional type, having a felly 2 in which is provided a bayonet joint slot 3 alining with a similar slot 4 in the felly rim 5 which is fixedly mounted upon the felly. This rim is provided with an outturned annular right angular flange 6 on the inner edge thereof, and is also provided with a series of outwardly projecting spaced apart lugs 7 and 8 with inclined walls 9 and 10, in the former of which are provided grooves 11, to receive the similarly formed tongues 12 projecting from the inclined walls 13 of the lugs 15 on the inner surface 16 of the demountable rim 17. The grooves 11 extend into the body of the rim to form means to guide the tongues 12 into said grooves on the lugs 7. Alternating with lugs 15 on the rim 17 are lugs 18 which conform to lugs 8 on rim 5 and are adapted to seat thereupon. The outer surface of rim 17 has its edges 19 and 20 curved inwardly to receive the ribs of the tire 21. An annular inturned flange 22 is provided on rim 17 which may be formed by crimping the sheet metal from which the rims are preferably stamped. The flange 22 is on the outside of the rim. Fixed to the rim 17 is an apron 23 which is adapted to form a closure for slot 3, the apron is provided with a tubular passage 24 through which the valve 25 projects. When the rim 17 is mounted this valve 25 operates in the slot 3.

Mounted diametrically opposite the valve apron 23 on the rim 17 is a lock member 26 having an apron 27 to conform in appearance to apron 23. The lock 26 consists of a bolt 28 operating in the barrel 29 and being pressed by a spring 30 said bolt having a stem 31 projecting through an opening in the head 32 of the barrel and which is provided with a hand hold 33 whereby the bolt may be operated against the action of spring 30. The bolt has a pin 34 extending through a slot 35 in the barrel and may be turned to seat on the shoulder 36 formed by a right angular extension of the slot 35 whereby the bolt may be held out of locking position. When the rim 17 is slipped into place over fixed rim 5, the lugs 15 and 18 are intermediate of the lugs 7 and 8 and a slight rotary movement then applied to rim 17 causes lugs 15 and 18 to seat against lugs 7 and 8 respectively and the tongues 12 to seat with the grooves 11, thereby locking the demountable rim against lateral movement. At the same time the end 37 of bolt 28 rides over and drops behind the lug 38, whereby the rim 17 is held against rotary movement relative to rim 5, thus securely locking the rim 17 upon the wheel. To demount said rim 17 all that is necessary is to draw the bolt 28 against the tension of spring 30 until pin 34 may be rotated to seat on shoulder 36, after which rim is given a quick rotary movement as in 5, thus causing the lugs 15 and 7 to separate, whereupon the rim 17 may be readily removed.

It will be noted that the flanges 6 and 22 of the rim members 5 and 17 are for the purpose of hiding the spaces 39 and 40 between the two rim members and the supporting lugs therein. The flange 6 (refer to Fig. 12) is spaced slightly apart from rim 17, as at 41, and the flange 22 is spaced slightly apart from the edge 42 of the rim 5, as at 43, in order to prevent any binding or sticking together of these parts, leaving the rims to be easily separated. The method of disconnecting and demounting the rim 17 is so simple that it may be accomplished in six seconds' time. The rim 17 may be stamped from sheet metal and will, therefore, be extremely light and easy to handle besides very inexpensive, while at the same time it will meet all requirements as to durability and strength.

Having now described my invention that which I claim as my invention is:

1. In combination a wheel the outer periphery of which is provided with a series of spaced lugs having circumferentially beveled surfaces, alternate lugs being provided with circumferentially extending grooves, a demountable rim provided with a corresponding series of inwardly extending beveled lugs adapted to seat in the first mentioned lugs, alternate lugs thereof being provided with projections adapted to be seated in the grooves of the first series of lugs by relative circumferential movement of the wheel and rim and means to prevent retrograde movement of the rim.

2. A demountable rim formed of sheet metal having means on the inner side thereof to secure it to a wheel in spaced relation and having at one side thereof an inwardly extending flange formed by crimping the material of the rim together the said flange having a thickness approximately double that of the rim.

3. In a wheel a fixed rim having a series of spacing lugs every alternate one of which has a smooth surface and the other alternate ones being provided with grooves and a demountable rim having coacting lugs every alternate one of which is provided with a tongue to engage with said grooves to lock the demountable rim against lateral movement.

4. In a wheel a fixed rim having a series of spacing lugs every alternate one of which has a smooth surface and the other alternate ones being provided with grooves and a demountable rim having coacting lugs every alternate one of which is provided with a tongue to engage with said grooves to lock the demountable rim against lateral movement, said grooves extending into the body of said fixed rim to form guides for the tongues.

In testimony whereof I affix my signature in the presence of two witnesses.

JOHN ARCHIE BORLAND.

Witnesses:
 F. M. FOORKE,
 BELL M. THOMPSON.